United States Patent
Zorn et al.

(10) Patent No.: US 8,713,679 B2
(45) Date of Patent: Apr. 29, 2014

(54) DETECTION OF CODE-BASED MALWARE

(75) Inventors: Benjamin Goth Zorn, Woodinville, WA (US); Benjamin Livshits, Kirkland, WA (US); Charles M. Curtsinger, Saint Paul, MN (US); Christian Seifert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 243 days.

(21) Appl. No.: 13/031,061

(22) Filed: Feb. 18, 2011

(65) Prior Publication Data
US 2012/0216280 A1    Aug. 23, 2012

(51) Int. Cl.
*G06F 21/00*    (2013.01)

(52) U.S. Cl.
USPC ........... 726/23; 726/22; 726/24; 726/25; 726/26; 713/187; 713/188; 713/192; 713/193

(58) Field of Classification Search
USPC ............... 726/22–26; 713/187–188
See application file for complete search history.

(56) References Cited

U.S. PATENT DOCUMENTS

| | | | |
|---|---|---|---|
| 4,819,233 A | 4/1989 | Delucia et al. | |
| 5,537,540 A | 7/1996 | Miller et al. | |
| 6,081,665 A | 6/2000 | Nilsen et al. | |
| 6,151,643 A | 11/2000 | Cheng et al. | |
| 7,117,488 B1 | 10/2006 | Franz et al. | |
| 7,350,235 B2 | 3/2008 | Jordan | |
| 7,367,024 B2 | 4/2008 | Barua et al. | |
| 7,707,634 B2 | 4/2010 | Sandu et al. | |
| 7,849,507 B1 * | 12/2010 | Bloch et al. .................... 726/22 |
| 2005/0235136 A1 | 10/2005 | Barsotti et al. | |
| 2006/0075468 A1 | 4/2006 | Boney et al. | |
| 2007/0113282 A1 | 5/2007 | Ross | |
| 2007/0152854 A1 * | 7/2007 | Copley .......................... 341/51 |
| 2007/0239993 A1 | 10/2007 | Sokolsky et al. | |
| 2007/0240215 A1 | 10/2007 | Flores et al. | |
| 2007/0250930 A1 | 10/2007 | Aziz et al. | |
| 2008/0263659 A1 | 10/2008 | Alme | |
| 2009/0089759 A1 | 4/2009 | Rajan et al. | |
| 2009/0265692 A1 | 10/2009 | Godefroid et al. | |
| 2009/0300764 A1 | 12/2009 | Freeman | |
| 2009/0327688 A1 * | 12/2009 | Li et al. ......................... 713/100 |
| 2009/0328185 A1 | 12/2009 | Van dean Berg et al. | |
| 2010/0031359 A1 | 2/2010 | Alme | |
| 2010/0180344 A1 | 7/2010 | Malyshev et al. | |

(Continued)

OTHER PUBLICATIONS

"Final Office Action", U.S. Appl. No. 12/369,018, (Dec. 16, 2011), 19 pages.

(Continued)

*Primary Examiner* — Thanhnga B Truong
*Assistant Examiner* — Josnel Jeudy
(74) *Attorney, Agent, or Firm* — Dan Choi; Carole Boelitz; Micky Minhas

(57) ABSTRACT

This document describes techniques for detection of code-based malware. According to some embodiments, the techniques utilize a collection of known malicious code and know benign code and determine which features of each type of code can be used to determine whether unclassified code is malicious or benign. The features can then be used to train a classifier (e.g., a Bayesian classifier) to characterize unclassified code as malicious or benign. In at least some embodiments, the techniques can be used as part of and/or in cooperation with a web browser to inspect web content (e.g., a web page) to determine if the content includes code-based malware.

18 Claims, 9 Drawing Sheets

(56) References Cited

U.S. PATENT DOCUMENTS

| | | | |
|---|---|---|---|
| 2010/0205674 | A1 | 8/2010 | Zorn et al. |
| 2011/0030060 | A1 | 2/2011 | Kejriwal |
| 2011/0239294 | A1* | 9/2011 | Kim et al. ............... 726/22 |
| 2013/0174258 | A1 | 7/2013 | Livshits et al. |

OTHER PUBLICATIONS

"Data Execution Prevention", Retrieved from <<http://technet.microsoft.com/en-us/library/cc738483.aspx>>on Mar. 11, 2011, 10 pages.

"Google Safe Browsing API", Retrieved from <<http://code.google.com/apis/safebrowsing/>>on Mar. 11, 2011, 2 pages.

"The "Aurora" IE Exploit Used against Google in Action", Retrieved from "http://praetorianprefect.com/archives/2010/01/the-aurora-ie-exploit-in-action/"on Mar. 10, 2011, (Jan. 15, 2010), 10 pages.

Abadi, Martin et al., "Control-Flow Intergrity", Retrieved from <<http://research.microsoft.com/pubs/64250/ccs05.pdf>>, (Nov. 2005), 14 pages.

Akritidis, et al., "Stride: Polymorphic Sled Detection through Instruction Sequence Analysis", Retrieved from <<http://dcs.ics.forth.gr/Activities/papers/stride-IFIP-SEC05.pdf>>, (2005), 16 pages.

Akritidis, Periklis et al., "Preventing Memory Error Exploits with WIT", 2008 IEEE Symposium on Security and Privacy. Retrieved from <<http://ieeexplore.ieee.org/stamp/stamp.jsp?tp=&arnumber=4531158>>, May 2008, 15 pages.

Anagnostakis, et al., "Detecting Targeted Attacks Using Shadow Honeypots", Retrieved from <<http://www.cs.columbia.edu/~angelos/Papers/2005/replay.pdf>>, (2005), 16 pages.

Bates, Daniel et al., "Regular Expressions Considered Harmful in Client-Side XSS Filters", Retrieved from <<http://www.collinjackson.com/research/xssauditor.pdf>>, (Apr. 26, 2010), 9 pages.

Bisht, Prithvi et al., "XSS-Guard: Precise Dynamic Prevention of Cross-Site Scripting Attacks", Retrieved from <<http://www.cs.uic.edu/~pbisht/XSSGuard_DIMVA2008_bisht.pdf>> 5th Conference on Detection of Intrusions and Malware & Vulnerability Assessment (DIMVA '2008) Springer LNCS link Paris, France, (Jul. 10, 2008), 20 pages.

Buscher, Armin et al., "MonkeyWrench—Boesartige Webseiten in Die Zange Genommen", Retrieved from <<https://www.bsi.bund.de/cae/servlet/contentblob/538316/publicationFile/30388/Armin_Buescher_pdf.pdf>>, (May 12, 2009), 9 pages.

Canali, Davide et al., "Prophiler: A Fast Filter for the Large-scale Detection of Malicious Web Pages", Retrieved from <<http://www.cs.ucsb.edu/research/tech_reports/reports/2010-22.pdf>>, (Nov. 2010), 10 pages.

Castro, Miguel et al., "Securing Software by Enforcing Data-flow Integrity", Retrieved from <<http://research.microsoft.com/en-us/um/people/tharris/papers/2006-osdi.pdf>>, (Nov. 2006), 14 pages.

Cova, Marco et al., "Detection and Analysis of Drive-by-Download Attacks and Malicious JavaScript Code", Retrieved from <<http://www.cs.ucsb.edu/~vigna/publications/2010_cova_kruegel_vigna_Wepawet.pdf>>, (2010), 10 pages.

Cowan, Crispan et al., "StackGuard: Automatic Adaptive Detection and Prevention of Buffer-Overflow Attacks", Proceedings of the 7th USENIX Security Symposium, San Antonio, TX. Retrieved from <<http://citeseerx.ist.psu.edu/viewdoc/download?doi=10.1.1.123.964&rep=rep1&type=pdf>>, (Jan. 26, 1998), 16 pages.

Egele, Manuel et al., "Defending Browsers against Drive-by Downloads: Mitigating Heap-spraying Code Injection Attacks", Proceeding DIMVA '09 Proceedings of the 6th International Conference on Detection of Intrusions and Malware, and Vulnerability Assessment. Retrieved from <<https://www.seclab.tuwien.ac.at/papers/driveby.pdf>>, (2009), 19 pages.

Ernst, Michael D., "Self-defending Software: Collaborative Learning for Security", Retrieved from <http://www.uwtv.org/programs/displayeventaspx?rID=24539&fID=4946> on Mar. 17, 2011 (2008), 1 page.

Feinstein, Ben et al., "Caffeine Monkey: Automated Collection, Detection and Analysis of Malicious JavaScript", Retrieved from <<http://www.secureworks.com/research/blog/wp-content/uploads/bh-usa-07-feinstein_and_peck-WP.pdf>>, (2007), 14 pages.

Hoffman, Billy "Circumventing Automated JavaScript Analysis", HP Web Security Research Group. Retrieved from <<http://ju12.tistory.com/attachment/cfile8.uf@15550B0E4AB2D0C60189B9.ppt>>, (2007), 64 pages.

Howard, Fraser "Malware with Your Mocha? Obfuscation and Anit-Emulation Tricks in Malicious JavaScript", Retrieved from <<http://www.sophos.com/security/technical-papers/malware_with_your_mocha.pdf>>, (Sep. 2010) 18 pages.

Howard, Michael "Address Space Layout Randomization in Windows Vista", Retrieved from <<http://blogs.msdn.com/b/michael_howard/archive/2006/05/26/address-space-layout-randomization-in-windows-vista.aspx>> on Mar. 11, 2011, (May 26, 2006), 3 pages.

Howard, Michael "Update on Internet Explorer 7, DEP, and Adobe Software", Retrieved from <<http://blogs.msdn.com/michael_howard/archive/2006/12/12/update-on-internet-explorer-7-dep-and-adobe-software.aspx>> on Mar. 11, 2011, (Dec. 12, 2006), 4 pages.

Hunt, Galen et al., "Detours: Binary Interception of Win32 Functions", Retrieved from <<http://citeseerx.ist.psu.edu/viewdoc/download?doi=10.1.1.48.3709&rep=rep1&type=pdf>>, (Feb. 1999), 9 pages.

Kawach, Rami "Neptune: Detecting Web-Based Malware via Browser and OS Instrumentation", Retrieved from <<https://community.qualys.com/servlet/JiveServlet/previewBody/1434-102-4-1675/Black_Hat_US_2010_Neptune.pdf>>, (Jul. 27, 2010), 10 pages.

Kijewski, Piotr et al., "The HoneySpider Network—Fighting Client-Side Threats", Retrieved from <<http://www.honeyspider.net/wp-content/uploads/2009/06/hsn-first2008-article-v02.pdf>>, (2008), 15 pages.

Kiriansky, Vladimir et al., "Secure Execution via Program Shepherding", Proceedings of the 11th USENIX Security Symposium (Security '02), San Francisco, CA. Retrieved from <<http://groups.csail.mit.edu/cag/rio/security-usenix.pdf>>, (Aug. 2002), 16 pages.

Likarish, Peter et al., "Obfuscated Malicious Javascript Detection Using Classification Techniques", Retrieved from <<http://citeseerx.ist.psu.edu/viewdoc/download?doi=10.1.1.155.5680&rep=rep1&type=pdf>>, (2010), 8 pages.

Livshits, Ben et al., "Nozzle and Zozzle: Javascript Malware Detection", Retrieved from <<http://research.microsoft.com/en-us/projects/nozzle/>>, (Jun. 5, 2009), 2 pages.

Meyerovich, Leo A., et al., "ConScript: Specifying and Enforcing Fine-grained Security Policies for Javascript in the Browser", Retrieved from <<http://citeseerx.ist.psu.edu/viewdoc/download?doi=10.1.1.164.2441&rep=rep1&type=pdf>>, (Nov. 18, 2009), 16 pages.

Miller, et al., "Bypassing Windows Hardware-enforced Data Execution Prevention", Retrieved from <<http://uninformed.org/?v=2&a=4>>, (Oct. 2, 2005), 5 pages.

Moshchuk, Alexander et al., "A Crawler-based Study of Spyware on the Web", Retrieved from <<http://citeseerx.ist.psu.edu/viewdoc/download?doi=10.1.1.104.2921&rep=rep1&type=pdf>>, (2006), 17 pages.

Moshchuk, Alexander et al., "SpyProxy: Execution-based Detection of Malicious Web Content", Retrieved from <<https://www.usenix.org/events/sec07/tech/full_papers/moshchuk/moshchuk.pdf>>, (Sep. 20, 2007), 16 pages.

Nadji, Yacin et al., "Document Structure Integrity: A Robust basis for Cross-site Scripting Defense", Retrieved from <<http://www.cs.berkeley.edu/~prateeks/papers/dsi-ndss09.pdf>>, (2009), 20 pages.

Nazario, Jose "PhoneyC: A Virtual Client Honeypot", Retrieved from <<http://usenix.org/events/leet09/tech/full_papers/nazario/nazario.pdf>>, (Apr. 1, 2009), 8 pages.

Newsome, James et al., "Polygraph: Automatically Generating Signatures for Polymorphic Worms", Retrieved from <<http://www.cs.berkeley.edu/~dawnsong/papers/polygraph.pdf>>, (2005), 16 pages.

Perdisci, Roberto et al., "Behavioral Clustering of HTTP-Based Malware and Signature Generation Using Malicious Network Traces", Retrieved from <<http://www.gtnoise.net/papers/2010/perdisci:nsdi2010.pdf>>, (2010), 14 pages.

(56) References Cited

OTHER PUBLICATIONS

Perdisci, Roberto et al., "McBoost: Boosting Scalability in Malware Collection and Analysis Using Statistical Classification of Executables", Retrieved from <<http://ieeexplore.ieee.org/stamp/stamp/jsp?arnumber=04721567>>, (2008), 10 pages.

Polychronakis, Michalis et al., "Emulation-based Detection of Non-self-contained Polymorphic Shellcode", Retrieved from <<http://citeseerx.ist.psu.edu/viewdoc/download;jsessionid=2F2CFE927EEE1C0712BBD2796535629F?doi=10.1.1.80.2785&rep=rep1&type=pdf>>, (2007), 20 pages.

Provos, Niels et al., "All Your iFrames Point to Us", Retrieved from "http://static.googleusercontent.com/external_content/untrusted_dlcp/research.google.com/en//archive/provos-2008a.pdf", (Feb. 4, 2008), 22 pages.

Provos, Niels et al., "The Ghost in the Browser Analysis of Web-based Malware", Retrieved from http://www.usenix.org/event/hotbots07/tech/full_papers/provos/provos.pdf>>, (2007), 9 pages.

Ratanaworabhan, Paruj et al., "Nozzle: A Defense against Heap-spraying Code Injection Attacks", Retrieved from <<http://www.usenix.org/events/sec09/tech/full_papers/ratanaworabhan.pdf>>, (Nov. 2008), 18 pages.

Ratanaworabhan, Paruj et al., "Nozzle: A Defense Against Memory-based Code Execution Attacks", *2008 ACM TBD*. Downlaoded from Client website on Oct. 21, 2010,(Aug. 2009), 9 pages.

Reis, Charles et al., "Browsershield: Vulnerability-Driven Filtering of Dynamic HTML", vol. 1, Issue 3, *ACM Press New York, NY, USA*, (Sep. 2007), 14 pages.

Roesch, Martin "Snort: Lightweight Intrusion Detection for Networks", *13th LISA Conference*. Retrieved from <<http://www.usenix.org/event/lisa99/full_papers/roesch/roesch.pdf>>, (1999), 11 pages.

Seifert, Christian et al., "Identification of Malicious Web Pages with Static Heuristics", Retrieved from <<http://homepages.mcs.vuw.ac.nz/~cseifert/publications/cseifert_staticheuristics_ATNAC2008.pdf>>, (1999), 6 pages.

Seifert, Christian et al., "Know your Enemy: Malicious Web Servers", Retrieved from <<http://www.net-security.org/dl/articles/KYE-Malicious_Web_Servers.pdf>>, (Aug. 9, 2007), 25 pages.

Song, Chengyu et al., "Preventing Drive-by Download via Inter-module Communication Monitoring", *ASIACCS '10*, Apr. 13-16, 2010, Beijing, China, Retrieved from <<http://ercis.icst.pku.edu.cn/modules/blog/wp-content/uploads/2010/07/1272322543985314844.pdf>>, (Apr. 13, 2010), 11 pages.

Stuurman, Thijs et al., "Honeyclients—Low Interaction Detection Methods", Retrieved from <<http://staff.science.uva.nl/~delaat/sne-2007-2008/p21/report.pdf>>, (Feb. 4, 2008), 38 pages.

Toth, Thomas et al., "Accurate Buffer Overflow Detection via Abstract Payload Execution", Retrieved from <<http://citeseerx.ist.psu.edu/viewdoc/download;jsessionid=602BFBBEB9EB67DC845DA904C302B153?doi=10.1.1.67.8208&rep=rep1&type=pdf>>, (2002), 17 pages.

Van Gundy, Matthew et al., "Noncespaces: Using Randomization to Enforce Information Flow Tracking and Thwart Cross-site Scripting Attacks", *Proceedings of the 16th Annual Network and Distributed System Security Symposium (NDSS)*, San Diego, CA. Retrieved from <<https://www.isoc.org/isoc/conferences/ndss/09/pdf/03.pdf>>, (Feb. 8, 2009), 13 pages.

Wang, Yi-Min et al., "Automated Web Patrol with Strider HoneyMonkeys: Finding Web Sites that Exploit Browser Vulnerabilities", Retrieved from <<http://citeseerx.ist.psu.edu/viewdoc/download?doi=10.1.1.100.224&rep=rep1&type=pdf>>, (Jul. 27, 2005), 12 pages.

Zhuge, Jianwei et al., "Studying Malicious Websites and the Underground Economy on the Chinese Web", Retrieved from <<http://honeyblog.org/junkyard/reports/www-china-TR.pdf>>, (Dec. 3, 2007), 18 pages.

"Non-Final Office Action", U.S. Appl. No. 12/369,018, (Mar. 20, 2012),19 pages.

"Non Final Office Action", U.S. Appl. No. 12/369,018, (Jun. 24, 2011),17 pages.

Brain, Marshall "How C Programming Works", available at <http://computer.howstuffworks.com/c28.htm>,(2004),4 pages.

Sharif, Monirul I., "Robust and Efficient Malware Analysis and Host-Based Monitoring", *A Thesis Presented to the Academic Faculty in Partial Fulfillment of the Requirements for the Degree Doctor of Philosophy in the School of Computer Science. Georgia Institute of Technology.*, available at <http://smartech.gatech.edu/bitstream/handle/1853/37220/sharif_monirul_i_201012_phd.pdf?sequence=1>,(Dec. 2010),205 pages.

"Non-Final Office Action", U.S. Appl. No. 13/339,322, (Aug. 26, 2013),11 pages.

"Final Office Action", U.S. Appl. No. 13/339,322, Feb. 7, 2014, 13 pages.

* cited by examiner

DETECTION OF CODE-BASED MALWARE

BACKGROUND

Today's online environment provides users with access to a wide variety of network-based content, such as websites. Some websites, however, may include computer code that can be harmful to a user's computing device. One example of such code is known as malware. Malware includes computer code (e.g., a software application, a utility, or other code) that can interfere with a computer's normal functioning. Typically, a computer is inadvertently exposed to malware when a user accesses content associated with the malware. For example, a user can open an email attachment that includes the malware or can navigate to a website that can cause the malware to be loaded onto the user's computing device. While some existing techniques attempt to detect and prevent malware infection of a computing device, some forms of malware continue to be difficult to detect.

One specific example of malware that can be difficult to detect is script-based malware. Script-based malware includes script code that can infect a computing device and cause the computing device to malfunction. Examples of script code that can be used to generate script-based malware include JavaScript, Visual Basic Script (VBScript), and so on. In an example scenario, a user navigates to a website that includes script-based malware. The script code of the script-based malware is then loaded onto the user's computing device, e.g., as part of the website code. A script engine on the computing device then parses the script code and the parsed script code is executed on the computing device. Execution of the parsed script code can cause a variety of undesirable activities on the computing device, such as the slowing and/or malfunctioning of applications running on the computing device.

One particular type of script-based malware attack is known as a heap spray. A typical heap spray includes three different components: a shellcode, a spray, and a vulnerability. The shellcode includes executable machine code that is placed on a heap (data structure) for a particular application (e.g., a web browser) when the malware is executed. The spray causes multiple copies of the shellcode to be allocated into the heap for the particular application, which causes the undesirable functioning associated with the malware. Finally, the vulnerability refers to the particular aspect of the application that is being exploited to allow the malware to be executed on the computing device, such as a memory safety vulnerability, an input validation vulnerability, and so on. While some techniques exist for detecting and/or preventing a heap spray attack, these techniques typically involve significant processing overhead such that it is not feasible to implement them in an on-the-fly scenario, such as part of a web browser security suite.

SUMMARY

This document describes techniques for detection of code-based malware. According to some embodiments, the techniques utilize a collection of known malicious code and known benign code and determine which features of each type of code can be used to determine whether unclassified code is malicious or benign. The features can then be used to train a classifier (e.g., a Bayesian classifier) to characterize unclassified code as malicious or benign. In at least some embodiments, the techniques can be used as part of and/or in cooperation with a web browser to inspect web content (e.g., a web page) to determine if the content includes code-based malware.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Example Environment

Figure 1:
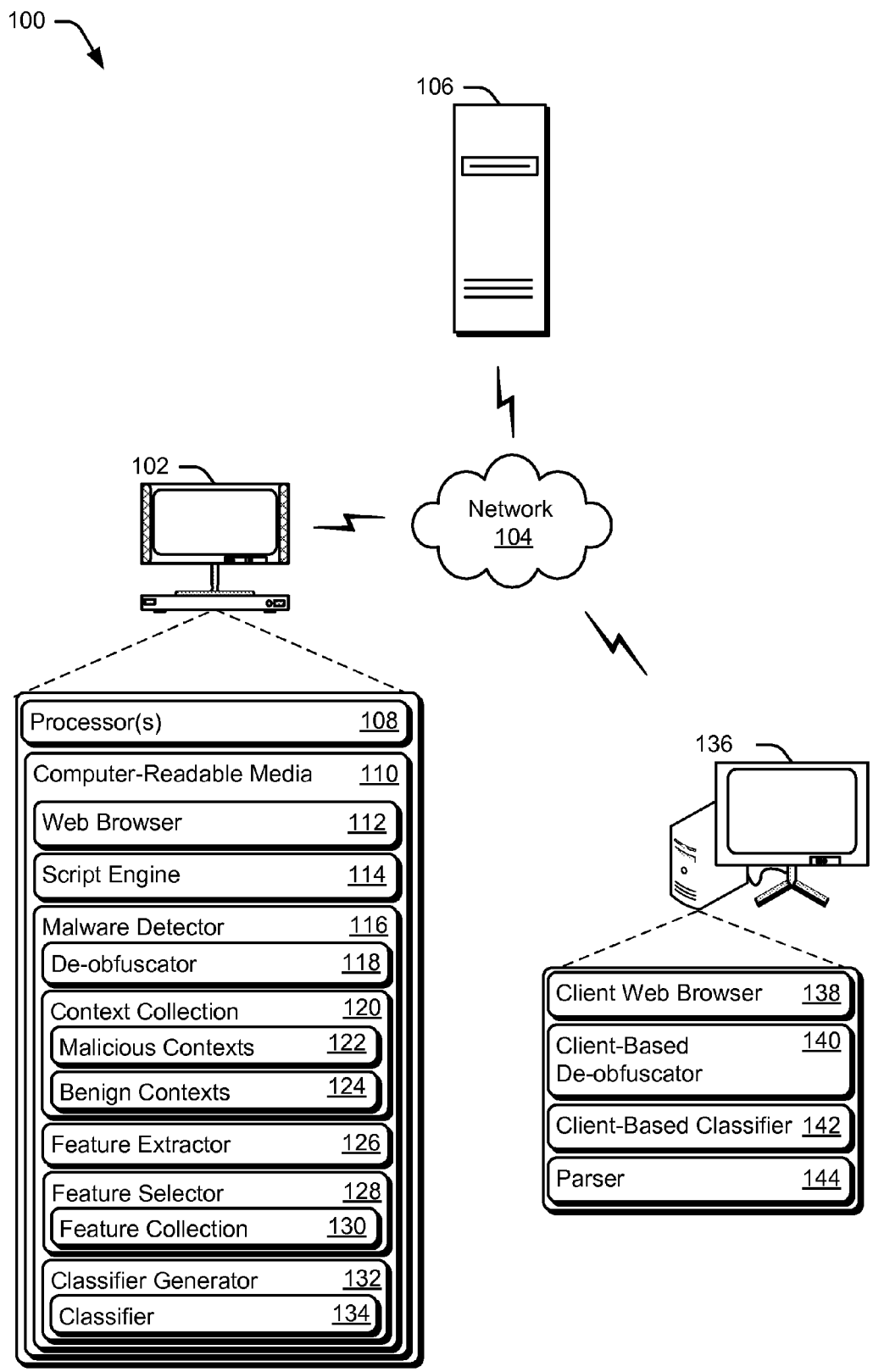
FIG. 1 is an illustration of an environment for detection of code-based malware.

FIG. 1 is an illustration of an environment 100 in which techniques for detection of code-based malware can operate. While various examples are discussed herein with reference to script code, the techniques discussed herein can be used with a variety of different types of code, such as Java, C#, Python, C, and so on, without departing from the spirit and scope of the disclosed embodiments. Environment 100 includes a computing device 102, a network 104, and a network resource 106. Computing device 102 is shown as a desktop computer for purposes of example only, and computing device 102 may be embodied as a variety of different types of devices. Network resource 106 can include a variety of different devices and entities from which web content can be retrieved, such as a web server, a local server (e.g., a LAN server), a cloud computing resource, and so on.

As also illustrated in FIG. 1, computing device 102 includes processor(s) 108 and computer-readable media 110. Computer-readable media 110 includes or has access to a web browser 112 and a script engine 114. In at least some embodiments, the script engine 114 is configured to load, compile, and/or run script code that is retrieved by the web browser 112, e.g., as part of a web page that is navigated to via the web browser.

The computer-readable media also includes a malware detector 116 that can implement various techniques for code-based malware detection discussed herein. In the context of script-based malware, the malware detector 116 can interact with the web browser 112 and/or the script engine 114 to inspect script code that is received from the network resource 106 and determine if the script code is associated with malware. Malware detector 116 is not limited to detecting script-based malware, however, and can be implemented to detect malware written in a variety of different types of code, such as those listed above. To implement various techniques discussed herein, the malware detector 116 includes a de-obfuscator 118 that can observe and/or record fragments of obfuscated script code that are generated as part of script code unfolding. Often, script code that is written as part of web content is subjected to obfuscation to hide all or part of the actual script code. For example, a writer of script-based malware code may obfuscate the script code in an attempt to avoid detection by other malware detection techniques. To address the issue of script obfuscation, the de-obfuscator 118 is configured to extract and collect fragments of obfuscated script code as the obfuscated script code is unfolded by the script engine 114 to reveal executable script code. One example illustration of script unfolding is discussed below in FIG. 4.

In some embodiments and as part of a script unfolding/de-obfuscation process, the de-obfuscator 118 is configured to intercept a call by the script engine 114 to a compile function that is invoked when an "eval" method is called during the process of unfolding obfuscated script code. When the call to the compile function is intercepted, a particular fragment of script code that is passed to the compile function can be observed by the de-obfuscator 118 before it is executed by the script engine 114.

In some implementations, a particular section of obfuscated script code can be subjected to multiple layers of obfuscation. Thus, in some embodiments, the de-obfuscator 118 is configured to observe and/or record each fragment of script code that results when a layer of obfuscated script code is unfolded. As discussed above, a layer of script code unfolding can be evidenced by a call to a compile function by the script engine 114. For purposes of the discussion herein, an individual fragment of script code that is observed and/or recorded in memory by the de-obfuscator 118 is referred to as a "code context." In at least some embodiments, a code context can be subjected to further processing to characterize all or part of a section of script code.

The malware detector 116 also includes a context collection 120 which includes malicious contexts 122 and benign contexts 124. According to some embodiments, the malicious contexts 122 include a collection of code contexts associated with known malware and the benign contexts 124 include a collection of code contexts associated with non-malware (e.g., code from legitimate websites). For example, code contexts included as part of the malicious contexts 122 and/or the benign contexts 124 can include code contexts that were observed by the de-obfuscator 118 and recorded to disk.

Also included as part of the malware detector 116 is a feature extractor 126 that is configured to extract features from a code context, such as a code context included as part of the malicious contexts 122 and/or the benign contexts 124. In at least some embodiments, the feature extractor 126 is configured to determine features of a particular code context by generating an abstract syntax tree (AST) for the code context and observing various aspects of the AST. For example, features of a particular code context can be determined based on structural aspects of an AST for the context (e.g., hierarchical aspects of the AST) and contents (e.g., textual aspects) of the AST, e.g., a substring included as part of a node of the AST. In at least some embodiments, a feature can be characterized by a code context in which the feature appears (e.g., a loop, a function, a conditional, a try/catch block, a string, a variable declaration, and so on) and text associated with a node of the AST, e.g., a substring.

According to some embodiments, the feature extractor 126 is configured to extract features for a particular code context at specific nodes of an AST for the context, such as at an expression node and a variable declaration node. For example, when the feature extractor encounters an expression node and/or a variable declaration node in an AST for a code context, the feature extractor can add a record of a new feature to a feature set for the code context.

The malware detector 116 also includes a feature selector 128 that includes and/or makes use of a feature collection 130. According to some embodiments, the feature selector 128 is configured to determine which of the features extracted by the feature extractor 126 have sufficient predictive qualities such that they can be used to determine if unclassified code is malicious or benign. Those features which are determined by the feature selector 128 to have sufficient predictive qualities can be stored as part of the feature collection 130. In at least some embodiments, the feature selector 128 can select features that are associated with a heap spray attack, such as a shellcode, heap spray code, and/or an associated software vulnerability.

In some example embodiments, the feature selector 128 can use a filter to determine which features have sufficient predictive qualities. One example of such a filter uses the chi squared ($\chi^2$) algorithm to test for characterization of a particular feature as malicious or benign. One example implementation of the $\chi^2$ algorithm is discussed in detail below.

Also included as part of the malware detector 116 is a classifier generator 132 and a classifier 134. In at least some embodiments, the classifier generator 132 makes use of features from the feature collection 130 to train the classifier 134 to recognize malicious code and benign code. For example, the classifier 134 can be configured to inspect features of a particular piece of unclassified code to determine if the unclassified code is malicious or benign. One example of the classifier 134 uses a naïve Bayesian classifier to calculate the probability that a particular code context is malicious or benign. While code classification is discussed herein with reference to malicious or benign code, techniques discussed herein can be used to classify code based on a variety of different categories or classifications without departing from the spirit and scope of the discussed embodiments. For purposes of illustration, consider the following example implementation of the classifier 134.

First, a probability is calculated for a known malicious code context or a known benign code context with a particular set of features using the Bayes rule. In the following equation, the variable L refers to the label (the known malicious code context or the known benign code context) and the variable F refers to the features included as part of the known malicious code context or a known benign code context.

$$P(L_i | F_1, \ldots, F_n) = \frac{P(L_i) P(F_1, \ldots, F_n | L_i)}{P(F_1, \ldots, F_n)} \quad \text{(A)}$$

Because the denominator is constant regardless of $L_i$, it can be ignored for the remainder of the derivation. Leaving out the denominator and repeatedly applying the rule of conditional probability, the equation above can be rewritten as follows:

$$P(L_i|F_1,\ldots,F_n)=P(L_i)\Pi_{k=1}^{n}P(F_k|F_1,\ldots,F_{k-1},L_i) \quad (B)$$

In this particular example, features of a particular code context are assumed to be conditionally independent. Thus, the previous equation can be simplified to:

$$P(L_i|F_1,\ldots,F_n)=P(L_i)\Pi_{k=1}^{n}P(F_k|L_i) \quad (C)$$

Once the probability of a particular label has been calculated (e.g., using the Bayesian method discussed above), an unclassified code context can be classified as malicious or benign. In at least some embodiments, classifying an unclassified code context as malicious or benign involves constructing an AST for the unclassified context, e.g., using the techniques discussed above and below for constructing an AST. Features are then extracted from the AST and probabilities are calculated for each of the features. The calculated probabilities for all of the features extracted from the AST are then multiplied together and then multiplied by the probability for a matching known code context, e.g., a known malicious code context or a known benign code context. According to some embodiments, a threshold probability can be set, above which a particular unclassified code context is considered malicious or benign.

The environment 100 also includes a client device 136 that includes and/or makes use of a client web browser 138, a client-based de-obfuscator 140, and a client-based classifier 142. In at least some embodiments, the client-based de-obfuscator 140 can de-obfuscate and/or unfold script code using techniques discussed herein. Additionally, the client device 136 can receive the client-based classifier 142 from the computing device 102 and can use the client-based classifier to inspect code (e.g., script) received by the client web browser 138. For example, the classifier generator 132 can generate the classifier 134 and provide the classifier 134 to client device 136 as the client-based classifier 142. Also included as part of the client device 136 is a parser 144. In at least some embodiments, the parser 144 is configured to parse code that is received by the client web browser 138. The parsed code can then be used to build an AST (e.g., using techniques discussed herein) that can be inspected by the client-based classifier 142 to determine if the code is malicious or benign.

Note that one or more of the entities shown in FIG. 1 may be further divided, combined, and so on. Generally, any of the functions described herein can be implemented using software, firmware, hardware (e.g., fixed-logic circuitry), manual processing, or a combination of these implementations. The terms "application", "module", "engine", "detector", "extractor", "classifier", and "selector", as used herein generally represent software, firmware, hardware, whole devices or networks, or a combination thereof In the case of a software implementation, for instance, these terms may represent program code (e.g., computer-executable instructions) that performs specified tasks when executed on a processor (e.g., CPU or CPUs). The program code can be stored in one or more computer-readable memory devices, such as computer-readable media 110. As utilized herein, computer-readable media can include all forms of volatile and non-volatile memory and/or storage media that are typically associated with a computing device. Such media can include ROM, RAM, flash memory, hard disk, removable media, and the like.

Example Processes for Detection of Code-Based Malware

The following discussion describes example processes for detection of code-based malware. Aspects of these processes may be implemented in hardware, firmware, software, or a combination thereof. These processes are shown as sets of blocks that specify operations performed, such as through one or more entities of FIG. 1, and are not necessarily limited to the order shown for performing the operations by the respective blocks. In portions of the following discussion reference may be made to environment 100 of FIG. 1, though these are not necessarily required.

Figure 2:
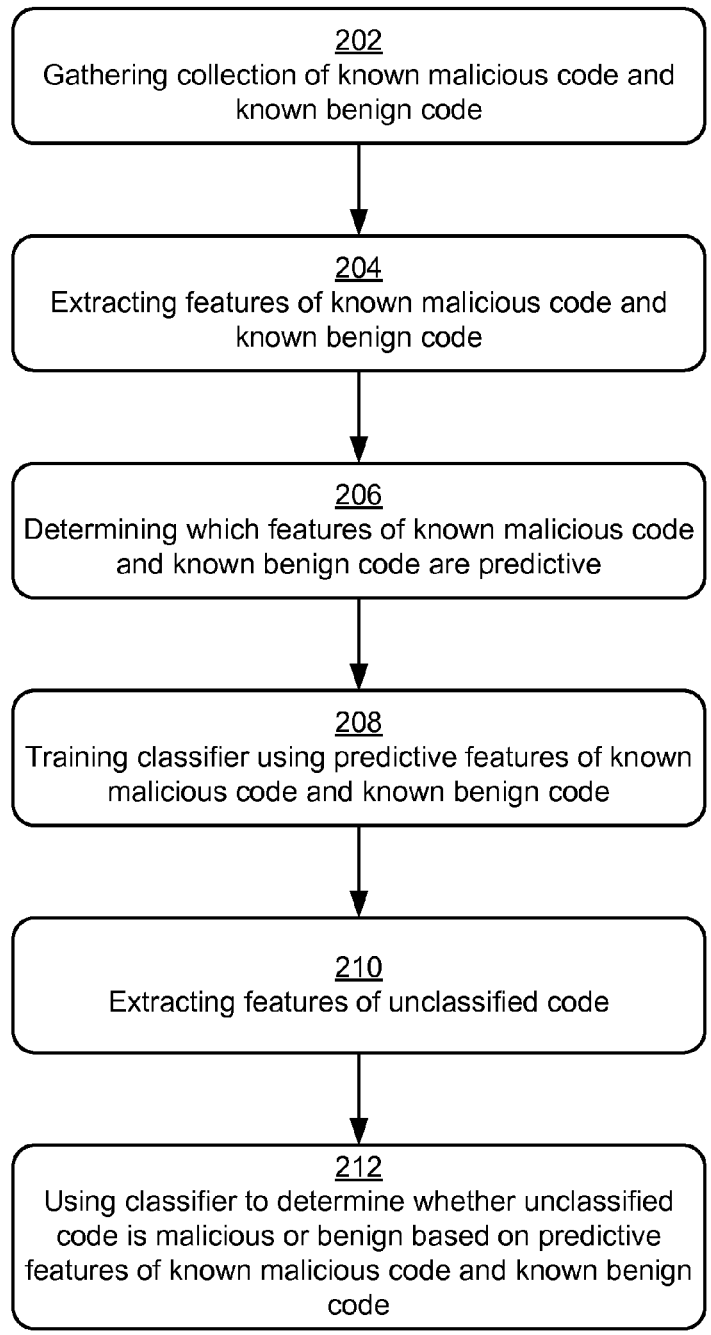
FIG. 2 is a flow diagram depicting an example process for detecting code-based malware in accordance with one or more embodiments.

FIG. 2 is a flow diagram depicting an example process 200 for detection of code-based malware. Block 202 gathers a collection of known malicious code and known benign code. For example, various web crawling techniques can be utilized to scan the web for malicious and benign web content that includes various types of code. Block 204 extracts features of known malicious code and known benign code. Example techniques for feature extraction are discussed in more detail above and below.

Block 206 determines which features of the known malicious code and the known benign code are predictive. Example techniques for determining which features are predictive are discussed in more detail above and below. Block 208 trains a classifier using the predictive features of known malicious code and known benign code. In at least some embodiments and as discussed in detail above, a Bayesian classifier can be trained using the predictive features.

Block 210 extracts features of unclassified code. One example process for extracting features of unclassified code is discussed in detail below. Block 212 uses the classifier to determine whether unclassified code is malicious or benign based on predictive features of known malicious code and known benign code.

Figure 3:
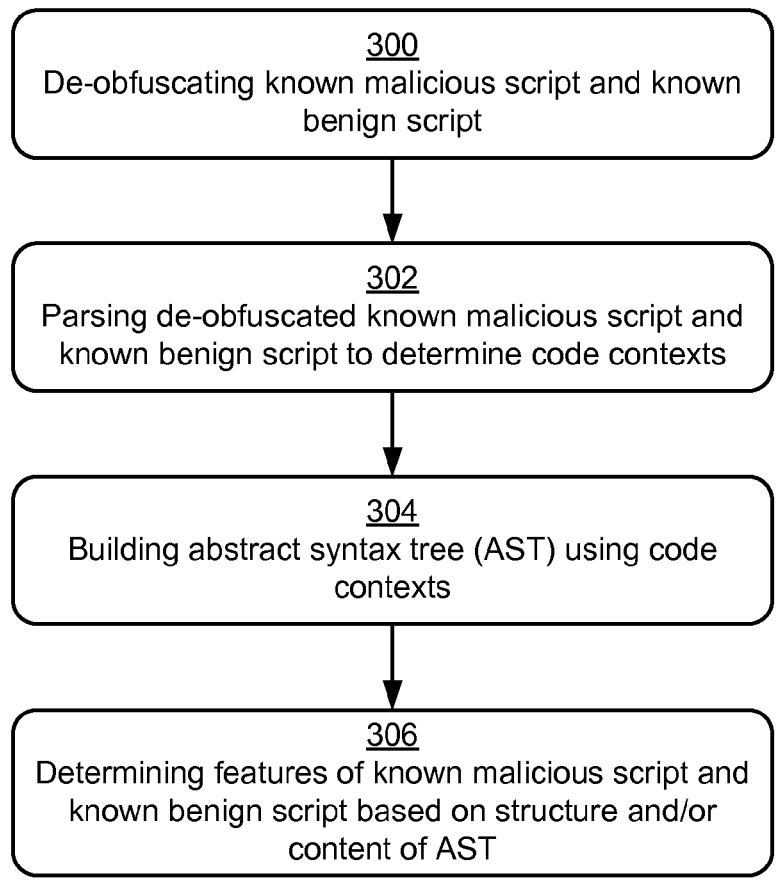
FIG. 3 is a flow diagram depicting an example process for extracting features of known malicious code and known benign code in accordance with one or more embodiments.

FIG. 3 is a flow diagram depicting an example process for implementing block 204 of example process 200 in the context of script code. Block 300 de-obfuscates known malicious script and known benign script. In at least some embodiments, the de-obfuscator 118 discussed with respect to FIG. 1 can be utilized to implement script de-obfuscation. One example of script unfolding that occurs during de-obfuscation is discussed below in FIG. 4. Block 302 parses the de-obfuscated known malicious script and known benign script to determine code contexts. Block 304 builds an abstract syntax tree (AST) using the code contexts. Block 306 determines features of the known malicious script and the known benign script based on the structure and/or content of the AST. One example of determining features from an AST is discussed below. In at least some embodiments, features are determined from the AST by traversing the AST from the root, pushing contexts from the AST onto a stack as the AST is ascended and popping them from the stack as the AST is descended.

In at least some embodiments, the de-obfuscator 118 and/or the client-based de-obfuscator 140 are configured to hook into script code at runtime and send a code context (e.g., a script context) to the classifier 134 and/or the client-based classifier 142 to be classified.

Figure 4:
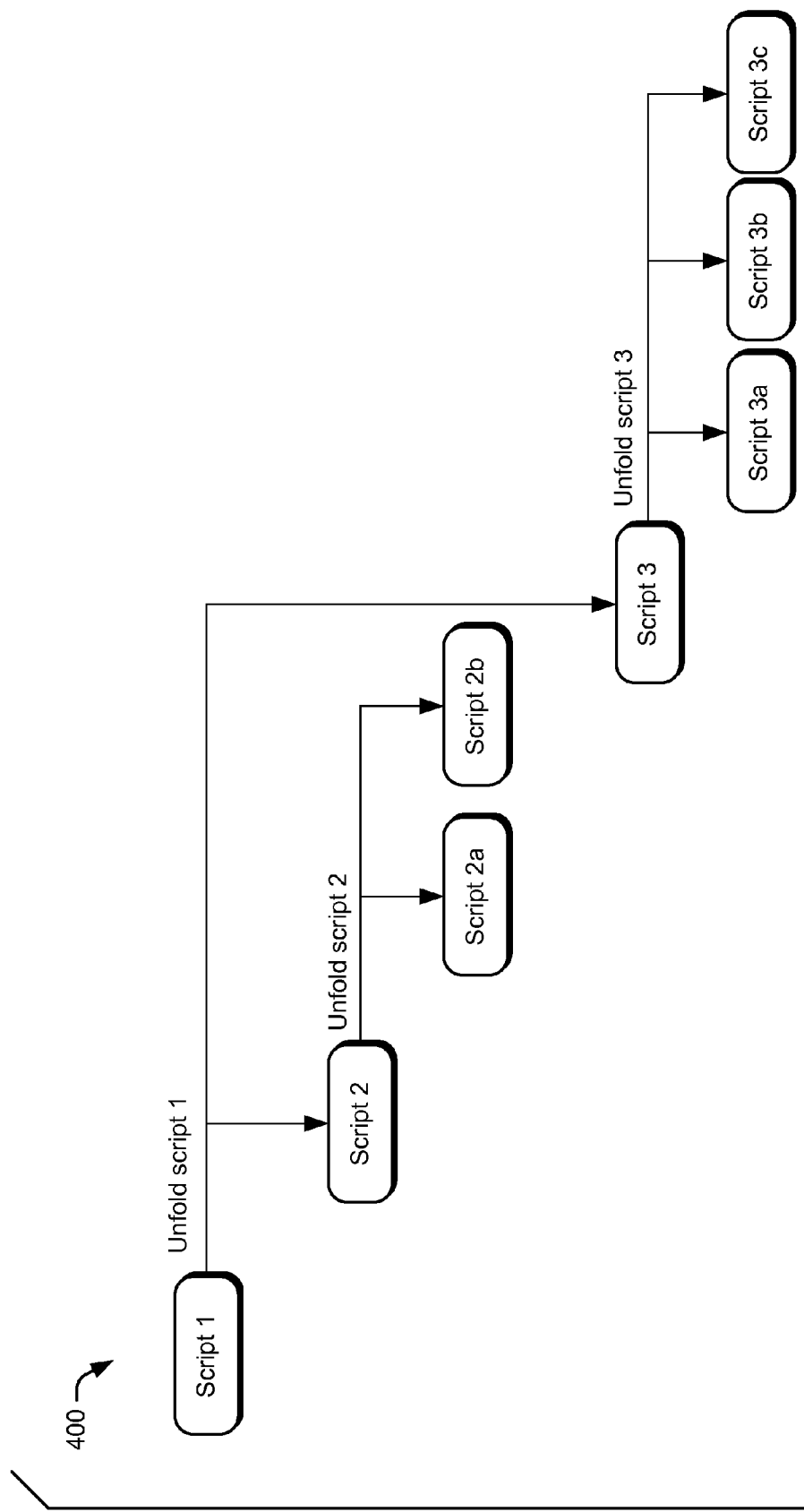
FIG. 4 is an illustration of one example of a script unfolding scenario that can occur during script de-obfuscation in accordance with one or more embodiments.

FIG. 4 illustrates at 400 one example of a script unfolding scenario that can occur during script de-obfuscation, such as part of implementing block 300 of FIG. 3 above and/or block 600 of FIG. 6, below. In at least some embodiments, script "unfolding" refers to the execution of script code (e.g., by the script engine 114) that produces and/or retrieves additional script code that can be executed and/or unfolded. For example, consider Script 1 of script unfolding scenario 400. Script 1 can include script code that is retrieved from a resource such as a web page, an application, a document, and so on. As illustrated, Script 1 is unfolded to reveal a Script 2 and a Script 3. Script 2 is then unfolded to reveal a Script 2a and a Script 2b, and Script 3 is unfolded to reveal a Script 3a, a Script 3b, and a Script 3c. Thus, Script 1 is fully unfolded to reveal multiple executable scripts. In the context of de-obfuscating unclassified script (e.g., as discussed in FIG. 6, below), each script that results from unfolding unclassified script can be inspected (e.g., by the client-based classifier 142) to determine if the script is malicious or benign.

Figure 5:
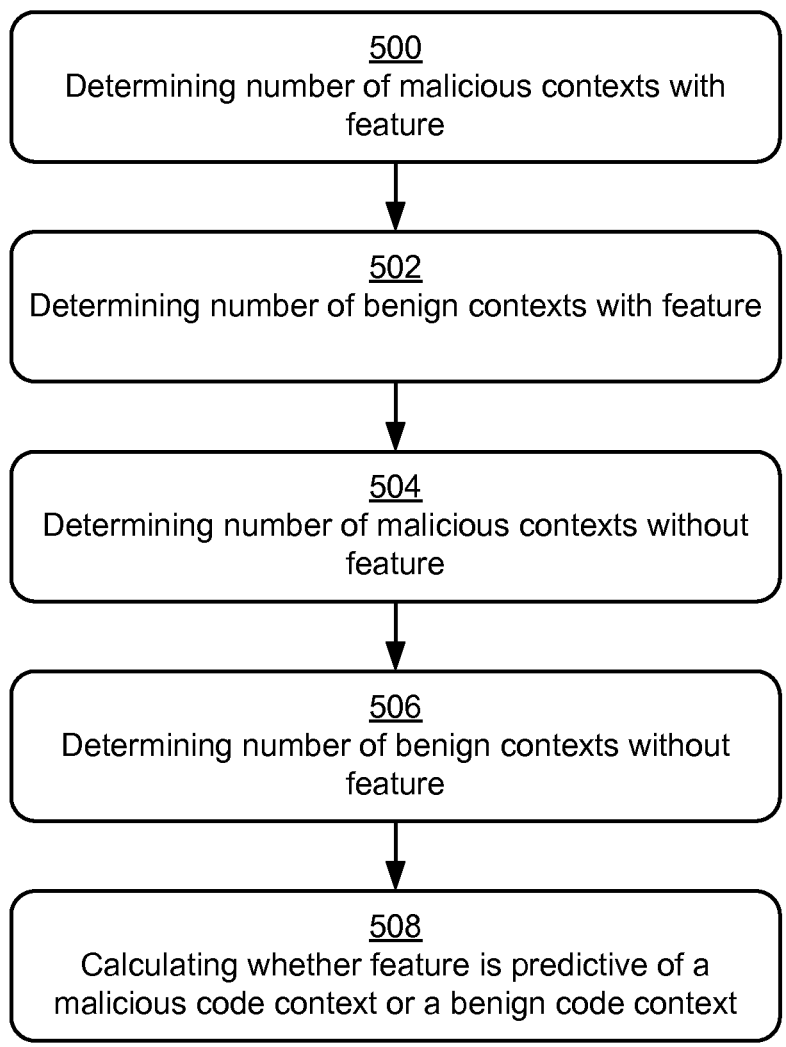
FIG. 5 is a flow diagram depicting an example process for determining which features of a known malicious code and a known benign code are predictive in accordance with one or more embodiments.

FIG. 5 is a flow diagram depicting an example process for implementing block 206 of example process 200. In at least some embodiments, the example process can be implemented using a discrete set of known malicious code contexts and known benign code contexts to determine if a particular feature is present or not in a particular context. Block 500 determines a number of malicious contexts with a particular feature. For example, a set of known malicious contexts can be inspected (e.g., using techniques discussed herein) to determine how many of the malicious contexts include the particular feature. Block 502 determines a number of benign contexts with the particular feature. For example, a set of known benign contexts can be inspected (e.g., using techniques discussed herein) to determine how many of the benign contexts include the particular feature.

Block 504 determines a number of malicious contexts without the particular feature. Continuing with the current example, the set of known malicious contexts can be inspected to determine how many of the malicious contexts do not include the particular feature. Block 506 determines a number of benign contexts without the particular feature. Further to the current example, the set of known benign contexts can be inspected to determine how many of the benign contexts do not include the particular feature.

Block 508 calculates whether the feature is predictive of a malicious code context or a benign code context. In at least some embodiments, the chi squared ($\chi^2$) algorithm can be used to determine if the particular feature is predictive. For example, consider the following calculation.

A=malicious code contexts with the particular feature.
B=benign code contexts with the particular feature.
C=malicious code contexts without the particular feature.
D=benign code contexts without the particular feature.
Using these variables, $\chi^2$ can then be calculated as follows:

$$\chi^2 = \frac{(A*D - C*B)^2}{(A+C)*(B+D)*(A+B)*(C+D)}$$

In at least some embodiments, features with a $\chi^2$ value greater than or equal to 10.83 (a probability value of 0.001) can be determined to be sufficiently predictive to be used to classify unclassified code.

Figure 6:
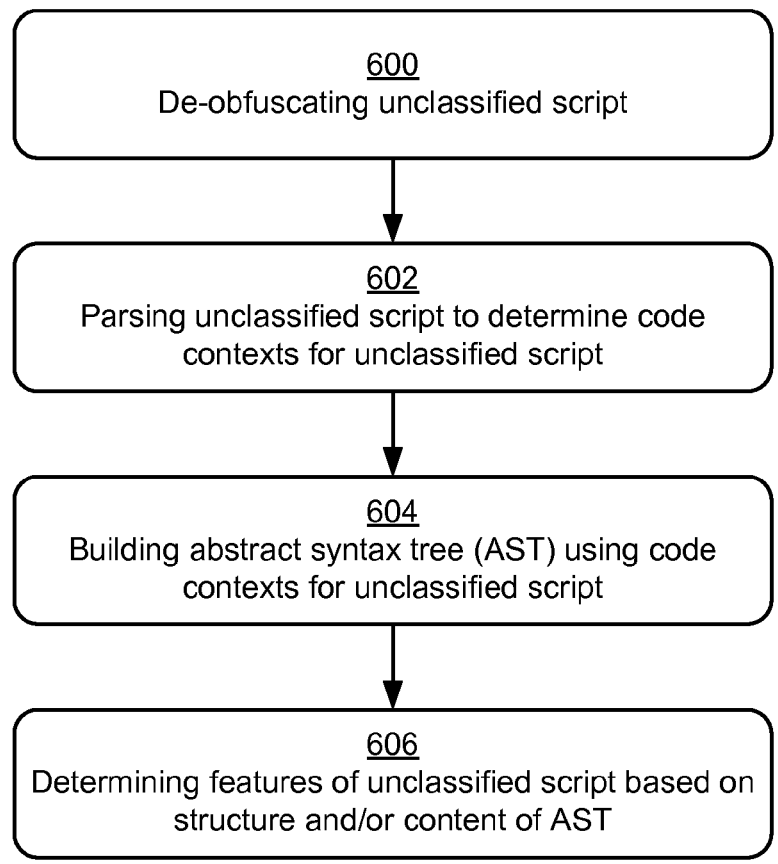
FIG. 6 is a flow diagram depicting an example process for extracting features of unclassified code in accordance with one or more embodiments.

FIG. 6 is a flow diagram depicting an example process for implementing block 210 of example process 200 in the context of script code. Block 600 de-obfuscates unclassified script. As discussed above, unclassified script can include script code that is retrieved from a web resource, such as a web page. Example techniques for script de-obfuscation are discussed above. Block 602 parses unclassified script to determined code contexts for the unclassified script.

Block 604 builds an abstract syntax tree (AST) using the code contexts for the unclassified script. Example techniques for building and/or utilizing an AST are discussed above and below. Block 606 determines features of the unclassified script based on the structure and/or content of the AST.

Figure 7:
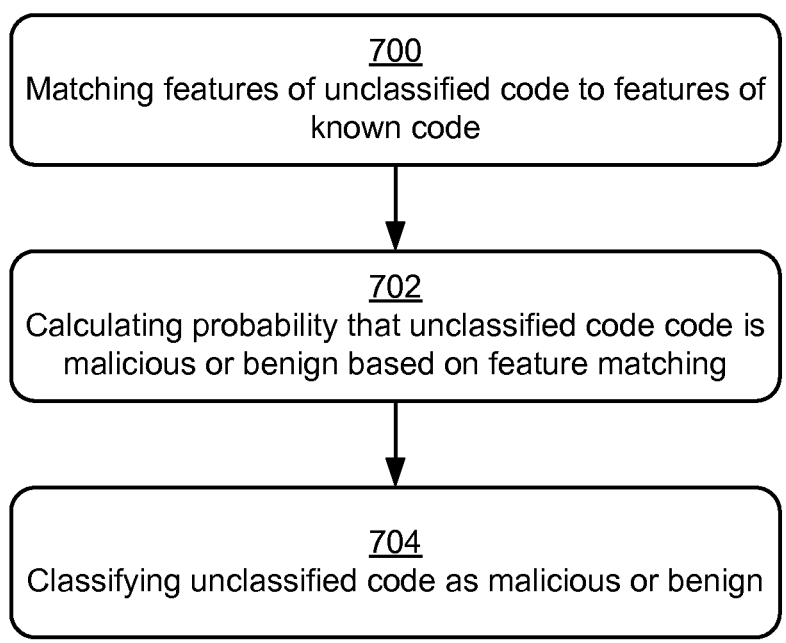
FIG. 7 is a flow diagram depicting an example process for determining whether unclassified code is malicious or benign in accordance with one or more embodiments.

FIG. 7 is a flow diagram depicting a process for implementing block 212 of example process 200. Block 700 matches features of unclassified code to features of known code. For example, features that are extracted from unclassified code (e.g., using all or part of the process illustrated in FIG. 6) can be matched to features of known malicious code and/or known benign code. Block 702 calculates a probability that the unclassified code is malicious or benign based on the feature matching. As discussed above, the probability can be calculated using a Bayesian classifier.

Block 704 classifies the unclassified code as malicious or benign. In at least some embodiments, the particular classification of the code can be based on the Bayesian calculations. The classification (e.g., malicious or benign) with the greater Bayesian calculation (e.g., the posterior numerator of equation (C), above) can be used to classify the unclassified code. In at least some embodiments, the classification can be expressed as a probability or other numeric value, e.g., as a weighted score.

Example Abstract Syntax Tree Feature Extraction

Figure 8:
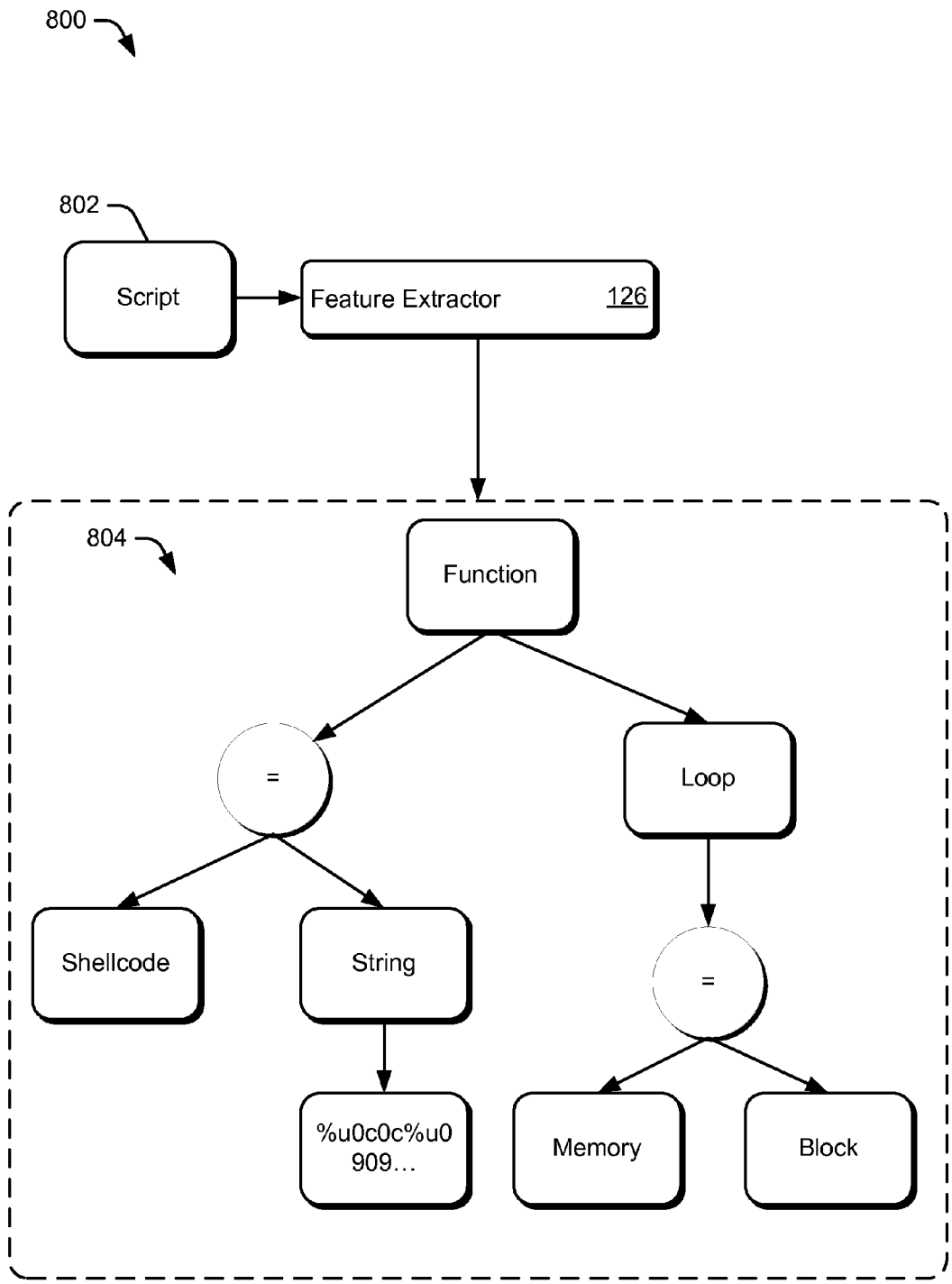
FIG. 8 is an example illustration of abstract syntax tree (AST) feature extraction in accordance with one or more embodiments.

FIG. 8 illustrates an example AST feature extraction scenario generally at 800. While feature extraction scenario 800 is discussed with respect to script code, this is not intended to be limiting. For example, the feature extraction scenario can be used to extract features from a variety of different types of code (examples of which are listed above). First, a script 802 is input into and/or retrieved by the feature extractor 126. The feature extractor 126 then processes the script (e.g., using techniques discussed above) and builds an AST that includes code contexts for the script. As part of the AST is a feature 804. The feature 804 includes various aspects that can be used to characterize the feature as being associated with malware, such as a variable named "shellcode", a string with a certain value, a loop, and so on.

Fast Pattern Matching

Various techniques can be used to match features of unclassified code with features of known code. According to at least some embodiments, a state machine can be constructed for known and/or unclassified code contexts that can be used to compare features between code contexts. In some examples, the state machine includes a state for each unique character (e.g., text character) occurring at each position in an AST for the features in a particular code context.

One example of pseudo-code for a fast pattern matching algorithm is presented below. According to some embodiments, the algorithm can be used to select state transitions based on the next character in an AST node text. Particular states can have a bit mask with bits corresponding to features of a code context. In at least some embodiments, bits are set for features that have the state's incoming character at that position. When the matching algorithm begins, a bitmap is set to all ones. The bit mask is then ANDed with the mask at each state visited during the matching process. At the end of the matching process, the bit mask includes a set of features that are present in the AST node. In at least some embodiments, this process can be repeated for each position in a node's text and features do not necessarily have to match at the start of the node.

Example Pattern Matching Algorithm:

```
matchList ← <1,1, ..., 1>
state ← 0
for all c in input do
    state ←matcher.getNextState(state, c)
    matchList←matchList∧ matcher.getMask(state)
```

```
        if matchListh <0,0, ... , 0>then
            return matchList
        end if
    end for
    return matchList
```

Figure 9:
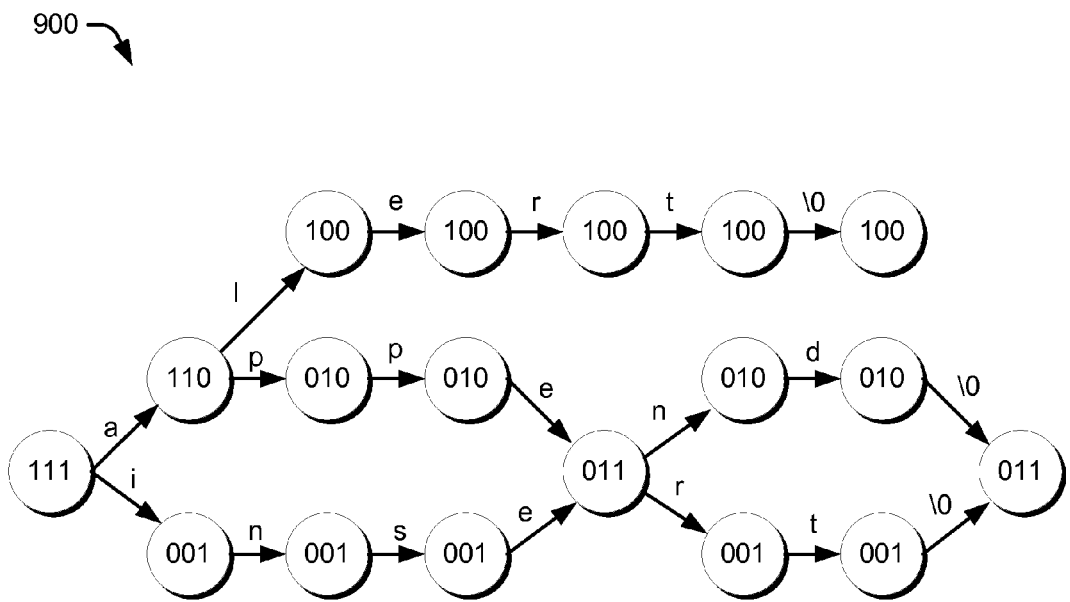
FIG. 9 is an example illustration of a state machine that can be used for pattern matching in accordance with one or more embodiments.

FIG. 9 illustrates an example state machine that can be used for fast pattern matching, generally at 900. According to some embodiments, the state machine includes a string matching state machine that can match three patterns: "alert", "append", and "insert". In this example, the matching algorithm is inspecting the text "appert" that is included as part of a feature has been extracted, e.g., from an unclassified code context. During the pattern matching, a bit array of size three (known as a "matched list") is maintained to indicate the patterns that have been matched to a given point in the matching process. In this particular example, the bit array starts with all bits set. From the leftmost state of the state machine 900 the edge labeled with the first character of "append", i.e., "a", is followed.

According to some embodiments, the match list is bitwise-ANDed with this new state's bit mask of 110. This process is repeated for the input characters "p", "p", and "e". At this point, the match list contains 010 and the remaining input characters are "r", "t", and null (also notated as "\0"). Even though a path to an end state exists with edges for the remaining input characters, no patterns will be matched. The next character consumed, an "r", takes the matcher to a state with mask 001 and match list of 010. Once the match list is masked for this state, no patterns will be matched. In at least some embodiments, the matcher terminates at this point and returns the empty match list.

Classifier Updating

In at least some embodiments, a classifier can be updated based on newly-discovered and/or analyzed code-based malware. For example, if a new code-based malware feature is discovered (e.g., using techniques discussed herein), the feature and its associated probability can be used to update the classifier 134 and/or the client-based classifier 142 discussed above. Thus, in some embodiments a classifier can be trained in an ongoing basis to enable it to recognize a larger variety of code-based malware.

Network-Based Classification

According to some embodiments, techniques discussed herein can be used by a network resource to classify code. For example, tools such as the malware detector 116 and its sub-modules can be hosted by a network resource such as a search engine and/or a uniform resource locator (URL) shortening service. In at least some embodiments, the network resource can classify code associated with network content (e.g., a webpage, a web document, and so on) before enabling access to the network content. In the context of classifying code as malicious or benign, when the network resource determines that network content is associated with malicious code, the network resource can prevent user access to the network resource and/or warn the user that the network resource has been classified as associated with malicious code. Thus, in at least some embodiments, the network resource can pre-classify network content (e.g., using web crawling techniques) prior to enabling user access to the network content.

CONCLUSION

This document describes techniques for detection of code-based malware. In some embodiments, these techniques enable code-based malware to be detected in an on-the-fly web browsing context. While techniques discussed herein are explained with reference to classifying code as malicious or benign, this is not intended to be limiting. For example, various techniques discussed herein can be utilized to classify a variety of different categories and/or types of code. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   one or more hardware processors; and one or more computer-readable storage media storing computer-executable instructions that are executable by the one or more hardware processors to cause the system to perform operations including:
      determining code contexts from known malicious script and known benign script;
      building abstract syntax trees (ASTs) using code found in the code contexts;
      extracting structural features from the known malicious script and known benign script based on structures and contents of the ASTs, the structural features being different from text of the known malicious script and the known benign script;
      comparing structural features from unclassified script with the structural features from the known malicious script and the known benign script; and
      classifying the unclassified script as malicious or benign based on the comparison of the structural features from the unclassified script with the structural features from the known malicious script and the known benign script.

2. The system as recited in claim 1, wherein the structural features from one or more of the known malicious script or the known benign script include one or more of a loop, a function, a conditional, a string, a variable declaration, or a try/catch block.

3. The system as recited in claim 1, wherein classifying the unclassified script as malicious or benign comprises using a state machine to match the structural features from the unclassified script with the structural features from one of the known malicious script or the known benign script.

4. The system as recited in claim 1, wherein classifying the unclassified script as malicious or benign comprises calculating a probability or another numeric score indicating that the unclassified script is malicious or benign.

5. The system as recited in claim 4, wherein the probability or another numeric score that the unclassified script is malicious or benign is calculated using a Bayesian classifier.

6. The system as recited in claim 1, wherein the structural features of the unclassified script are determined by:
   de-obfuscating the unclassified script;
   building one or more abstract syntax trees (ASTs) using the de-obfuscated unclassified script; and
   determining the structural features of the unclassified script based one or more of the contents or the structure of the one or more ASTs.

7. A computer-implemented method comprising:
   extracting a first set of structural features from known code by:
      unfolding the known code to determine code contexts associated with the known code;

building one or more abstract syntax trees (ASTs) using the code contexts; and determining the first set of features based on the structure of the one or more ASTs;

extracting a second set of structural features from the first set of structural features based on a determination of which features of the first set of structural features are predictive of a particular code classification, the second set of structural features being a subset of the first set of structural features and excluding one or more features of the first set of structural features that are determined not to be predictive of a particular code classification;

training a classifier using the second set of structural features; and classifying with the classifier unclassified code based at least in part on the second set of structural features.

8. The method as recited in claim 7, wherein the known code comprises known malicious code and known benign code, the particular code classification comprises classifying code as malicious or benign, and wherein classifying the unclassified code comprises classifying the unclassified code as malicious or benign.

9. The method as recited in claim 7, wherein the determination of which features of the first set of features are predictive of the particular code classification is based on an analysis of the features of the first set of features using a $\chi^2$ algorithm.

10. The method as recited in claim 7, wherein the classifier is configured to be implemented in a web browsing environment.

11. The method as recited in claim 7, wherein classifying the unclassified code comprises using a state machine to match one or more features from the unclassified code with one or more features from the second set of features.

12. The method as recited in claim 7, further comprising updating the classifier with a third set of features from different known code.

13. A computer-implemented method comprising:

building an abstract syntax tree (AST) using code contexts retrieved from one of a known malicious script or a known benign script;

determining features of the known malicious script or the known benign script based on the structure and textual contents of the AST;

matching features of an unclassified script to the features of the known malicious script or the known benign script; and classifying the unclassified script as malicious or benign based on the matching.

14. The method as recited in claim 13, wherein the code contexts comprise fragments of code from one of the known malicious script or the known benign script.

15. The method as recited in claim 13, wherein building the AST comprises:

de-obfuscating the one of the known malicious script or the known benign script; and running the de-obfuscated known malicious script or known benign script to determine the code contexts.

16. The method as recited in claim 13, wherein the features of the known malicious script or the known benign script comprise one or more of structural features or content features.

17. The method as recited in claim 13, wherein the features of the known malicious script or the known benign script are used to train a classifier, and wherein classifying the unclassified script as malicious or benign is implemented by the classifier.

18. The method as recited in claim 17, wherein the classifier is configured to classify the unclassified script as malicious or benign by calculating a probability or a numeric score that the unclassified script is malicious or benign.

* * * * *